Patented Jan. 10, 1933

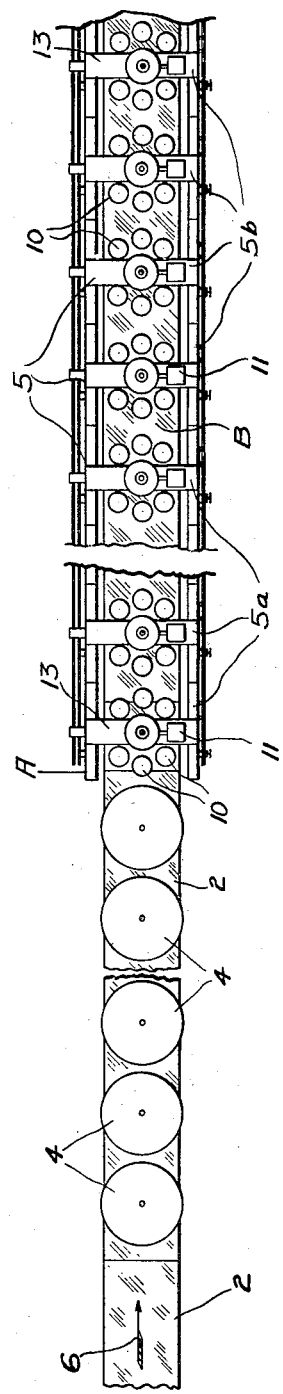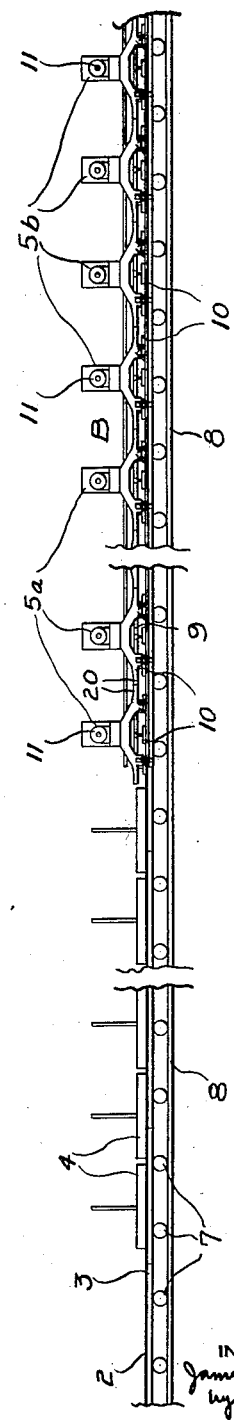

1,893,985

UNITED STATES PATENT OFFICE

JAMES W. CRUIKSHANK, OF PITTSBURGH, PENNSYLVANIA, ASSIGNOR, BY MESNE ASSIGNMENTS, TO PILKINGTON BROTHERS LIMITED, OF LANCASHIRE, ENGLAND, A BRITISH COMPANY

POLISHING GLASS

Application filed October 21, 1926. Serial No. 143,205.

The present invention relates to the polishing of glass, and more particularly, to the so-called continuous process of polishing, such as disclosed, for example, in the Brockett Patent, No. 741,001.

In the continuous process of making plate glass, the glass sheets, after being cast and rolled, are bedded upon tables which pass in a continuous line first beneath the grinders, and then beneath polishers which grind and polish the surface of the glass. The glass is then turned over and bedded on another set of tables and passed beneath grinders and polishers which finish the other side of the glass.

The polishing is carried out by polishing machines known as polishers, which are provided with felt polishing blocks which are given a rotary or reciprocatory motion over the surface of the glass. These polishing machines usually comprise a bridge which spans the moving table of glass carrying a motor-driven rotating head or runner holding polishing blocks or felts.

Rouge is supplied to the polisher or fine abradent for polishing the glass. When the polishing felts are put into service, they are wet, and as they operate over the glass, they pick up the rouge. It is found that the rouge is liable to become caked on the polishing felts or that the surfaces of the polishing felts are liable to become glazed, which causes streaks to be worn into the glass by such felts, such streaks being technically known in the art as "sleeks".

In the continuous polishing of glass, it is sometimes very difficult to determine just what polisher and which block is causing the sleeks. The sleeks are not in the nature of deep gouges or scratches in the glass, but rather a surface streak which, if it occurs in one of the first polishers which operate on the glass, will ordinarily be removed by subsequent good polishers.

The present invention relates particularly to an improved arrangement for removing polishers, cleaning them and replacing them so as to insure that the glass will be properly polished without sleeks.

In the accompanying drawings, I have illustrated my invention as embodied in the usual apparatus for the continuous grinding and polishing of plate glass. In the drawings:

Figure 1 is a plan view showing diagrammatically an arrangement of grinders and polishers in a system embodying my invention;

Figure 2 is a side elevation of the apparatus shown in Figure 1;

Figure 3:
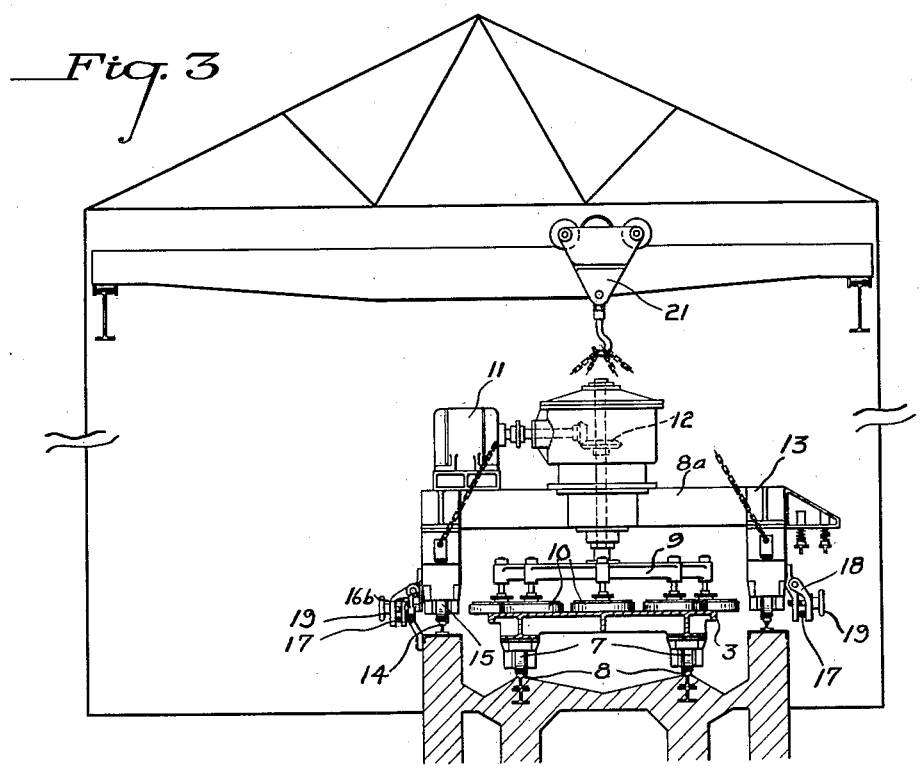
Figure 3 is an end elevation of one of the polishers, the view being taken in section through the moving table and its supports.

Referring to the embodiment of the invention as illustrated in the drawings: The glass plates 2 to be polished are bedded on traveling tables 3, which are coupled together to pass in a continuous line beneath the grinders 4 and the polishers 5. The motion of the table is ordinarily continuous in the direction indicated by the arrow 6. The tables are usually mounted upon truck wheels 7, which roll along the tracks 8. The glass thus has one side ground and polished and is then removed from the tables, and if the other side has not been polished, is bedded again and is put through the same process. Ordinarily, the tracks beneath the grinders and the polishers are continuous so that the glass travels continuously beneath the grinders and then beneath the polishers. In some systems, however, the glass is first ground and then transferred to another set of tracks and is passed beneath the polishers.

Figure 4:
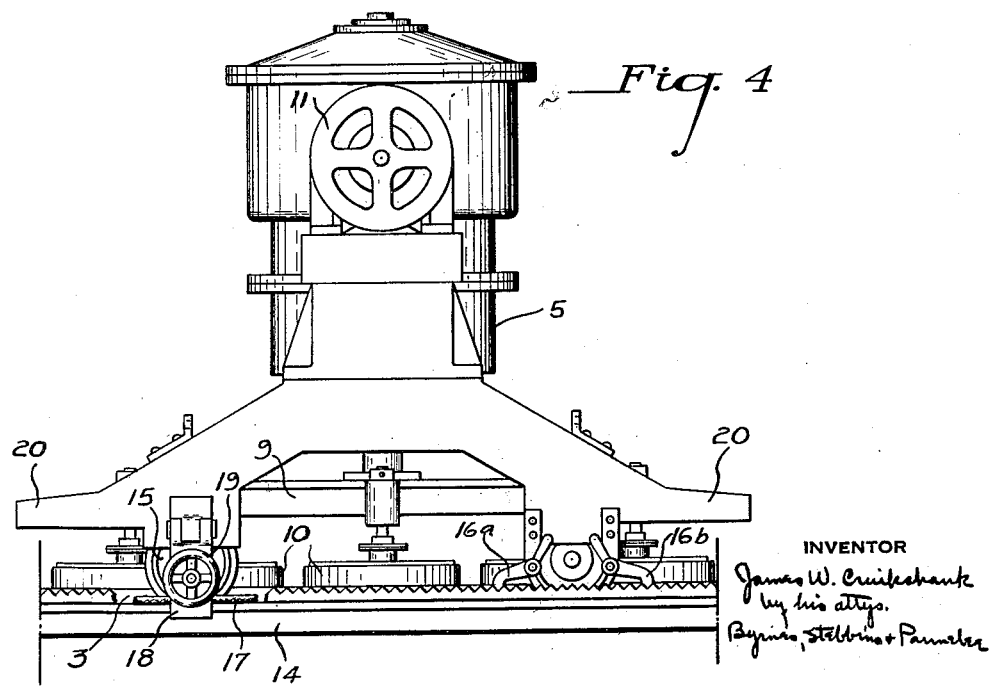
Figure 4 is a side elevation of one of the polishers.

The polishers 5 consist of rotating runners or heads 9, which carry a number of polishing blocks or felts 10. The runners 9 are driven by motors 11, through gearing 12, the polishing apparatus being mounted on bridges 13, which span the line of tables and which are movable, when desired, along the bridge-supporting rails 14. The polishers have wheels 15 which engage the rails 14, but are normally locked from movement by means of pawls 16a and 16b adapted to engage a suitable rack 16c stationarily mounted beside the rack 14 in any desired manner. When the pawl 16a is raised, the polishing machine is free to move in the left-hand direction, as viewed in Figure 4, but is held against movement in the other direction by the pawl 16b. When the pawl 16b is raised and the pawl 16a is lowered, the polishing machine is free to move to the right, as viewed in Figure 4, but is held against movement to the left.

This arrangement permits any polisher or group of polishers to be moved relative to and independently of other polishers or groups of polishers. The polishers may be moved by various means. If it is desired to move a polisher or group of polishers in the direction of movement of the glass, the appropriate pawl 16a or 16b is raised and the polisher is moved along with the glass by the frictional contact of its polishing blocks therewith. As will be readily apparent, although the polishing blocks may be rotated with respect to the glass, nevertheless, the movement of the glass will have a tendency to move the polishing blocks, as a whole, and consequently, the polishing machine, along with the glass. This movement will be ordinarily resisted by the proper pawl 16a or 16b. After the polisher or polishers have been moved to the desired position by the travel of the glass, the pawls are dropped and the polishers are then locked in position. If it is desired to move the polishers opposite to the normal direction of travel of the glass-supporting tables, this may be done in various ways. For example, cables 17 moving opposite to the direction of travel of the glass may be employed. These cables are engaged by clamps 18, carried at the sides of the polisher bridges. The clamps can be set against the cables by the hand wheels 19. Any suitable clamping mechanism can, of course, be employed, the screw-operated clamps being shown merely for the purpose of diagrammatic illustration. When the desired polisher or group of polishers has been moved, the cable may be stopped or the clamps released, and the polishers then locked in position. If desired, the polishers may be moved in a direction opposite to the normal direction of the travel of the glass by reversing the travel of the tables and moving the tables back a limited distance to transport the polisher or polishers by their frictional engagement with the glass back to the desired position.

In case the tables travel forward with a limited oscillatory or reciprocatory motion, such as described in my copending application, Serial No. 137,725, filed September 16, 1926, the polishers may be moved in either direction along their tracks by simply disengaging the proper holding pawl 16a or 16b.

As described in said application, the line of the tables moves forward a certain distance, then backward a lesser distance, forward again a greater distance and so on, so that the glass travels forwardly beneath the tables with a resultant speed about equal to the normal travel of the glass in the processes employing a continuous forward movement. This reciprocatory forward feed of the tables will ordinarily not be employed where the tables pass continuously from the grinders immediately to the polishers.

The polishers are preferably provided with bumpers 20, so that the polishing blocks or adjacent polishers can not foul one another. Also, the bumpers can be employed in case it is desired to push one polisher by another in the moving line; as for example, if a group of polishers is to be moved by the cables 17, the clamps on but one polisher need be set.

It will be apparent from the foregoing description that the apparatus has great flexibility in the movement and positioning of the polishers relatively to each other. Any polisher or group of polishers may be moved with respect to another polisher or group of polishers. This allows certain of the polishers to remain stationary, while other polishers are moved if desired. Some of the various ways in which the polishers may be moved to allow removal, cleaning and replacement will now be described, particularly the preferred methods of removing and replacing the polishers.

If desired, the whole line of polishers 5 may be moved. When this is done, the line is preferably moved in a direction opposite to the normal travel of the glass, in which case, the polishers will be removed from the head of the line at the place indicated by A in Figure 1, and clean polishers will be placed at the foot of the line which, in such case, will be at the extreme end of the line of polishers where the polishing of the glass is complete. For convenience, the term "head of the line", in referring to the group of polishers which are moved, will be used to designate the end of the line toward which the polishers are moved; and the term "foot of the line" will be used to designate the end from which the polishers are moved and at which the cleaned polishers are replaced.

In moving the line of polishers as above described, the entire line will be moved intermittently. As often as desired, the polisher at the head of the line will be removed by an overhead crane 21, and cleaned and then replaced at the foot of the line, the line then being moved along the length of one of the polishers. If desired, of course, a reserve polisher can be immediately put in the line after the removal of the polisher to be cleaned, which latter polisher will again be put in the line. The movement of the polishers in the direction opposite to the normal direction of travel of the glass has certain advantages. Different grades of rouge are ordinarily employed at different locations along the line of polishers, the finest grade of rouge being fed to the polishers operating last on the glass, and the coarser grades to the polishers which operate upon the glass as it comes from the grinders. When the polishers are moved opposite to the normal travel of the glass, there is no danger of the coarser rouge contaminating the finer rouge and scratching the glass in the last polishing operations. A freshly cleaned and wet polisher has a tendency to wipe the rouge from the glass and not to become an efficient polishing unit until enough rouge has been carried to it to fill the felts with rouge. It is therefore advantageous to insert the freshly cleaned polishers into the line at a point where they can pick up rouge coming to them from previously operating polishers. This place is preferably at the extreme end of the line where the glass passes from beneath the polishers, as there is no particular objection to having the glass wiped clean at this point as the newly inserted polisher is picking up its rouge.

Instead of moving the entire line of polishers, a single polisher or group of polishers may be moved while the other polishers remain stationary. Under certain conditions, it may be preferred to move only a part of the polishers, preferably the polishers toward the end of the line where the last or fine polishing operations are carried out. In this case, a group of polishers next following the grinders may be allowed to remain permanently stationary or may be taken out and cleaned less often than the polishers toward the final polishing end of the line. This will permit the coarse polishers to operate continuously, and very seldom, if ever, will it be necessary to insert in the stationary group of coarse polishers a freshly cleaned polisher. This is an advantage because when a polisher is freshly cleaned and inserted, it takes some little time for it to pick up the rouge and get back into efficient polishing. There is no insuperable objection to allowing the coarse polishers to cake up and make certain sleeks on the glass because these sleeks can be removed by the subsequent polishers, which are removed and cleaned often enough to prevent them in themselves putting sleeks into the glass.

It will be understood that the phrase, permitting the polishers to remain "stationary", as used herein, means stationary with respect to the tracks, as distinguished from stoppng the rotary polishing motion of the polishing blocks.

When a group of polishers is stationary and another group is moved, the group which is moved may be moved in various ways. For example, assume that the group of polishers indicated by the reference numeral 5ª is allowed to remain stationary and the group of polishers indicated by the reference numeral 5ᵇ is to be moved. The group of polishers 5ᵇ may be moved either with the normal travel of the glass or in the opposite direction. In case they are moved with the normal travel of the glass, all that it is necessary to do is to release the proper pawls 16ª or 16ᵇ and allow the polishers to travel with the glass the proper distance and then lock them in position. This will open up a space at the point indicated by B in the drawings where a freshly cleaned polisher may be inserted. A used polisher is then, of course, lifted from the head of the moved group of polishers 5ᵇ. Or, if desired, the group of polishers 5ᵇ may be moved in the direction opposite to the travel of the glass.

The polishers are moved along their supporting tracks along the line of travel of the glass, and this movement of the polishers may be in either direction, as desired, along the line of travel of the glass.

Since there is great flexibility in the arrangement and movement of the polishers, the polishers may be removed and replaced in various other ways. For example, if it is found that a particular polisher is causing sleeks on the glass, that polisher may be immediately lifted out of the line, and then the other polishers in the line moved up to close the space without interruption in the operation or affecting the finish given to the glass. It is of considerable advantage when a polisher is thus removed to move up the polishers behind it to close the gap, rather than to insert a freshly cleaned polisher which would have the tendency, by wiping the glass at that point, to temporarily interrupt the polishing at such point.

While I have illustrated and described the preferred embodiment of my invention, it is to be understood that the invention is not so limited, but may be otherwise embodied within the scope of the following claims.

I claim:

1. In apparatus for polishing moving sheets of glass, the combination of means for advancing the glass sheets, polishers freely movable in opposite directions along the line of travel of the glass in frictional engagement therewith, means selectively releasable at will to hold the polishers against movement in one direction while permitting movement in the opposite direction, and means for positively moving the polishers in a direction opposite the travel of the glass on one selective release of the holding means, said polishers being adapted to be moved in the opposite direction by frictional engagement with the glass on a different selective release of the holding means.

2. In apparatus for polishing sheets of glass, the combination of a track or way work tables thereon on which the sheets are moved, a frame bridging said track and supported to move freely in opposite directions along the line of travel of the glass, a polisher on said frame in engagement with the glass, a locking device to prevent movement of the frame in the direction of movement of the glass and operable to release the frame to permit reverse movement of the same, a second locking device to prevent reverse movement of the frame and operable to release the frame to permit its advance, and means for positively moving the frame in reverse direction on the release of the first mentioned locking device, said frame being adapted on the release of the second mentioned locking device to be moved in the direction of travel of the glass by the frictional engagement of the polisher therewith.

3. In apparatus for polishing sheets of glass, the combination of a track or way work tables thereon on which the sheets are moved, a frame bridging said track and supported to be moved in opposite directions along the line of travel of the glass, a polisher on said frame in engagement with the glass, a fixed rack extending along the line of travel of the frame, a pawl on the frame engaging the rack to prevent movement of the frame in the direction of movement of the glass and operable to release the frame, a second pawl on the frame engaging said rack to prevent reverse movement of the frame and operable to release the frame, and means for positively moving the frame in reverse direction on the release of the second mentioned pawl, the said frame being adapted on the release of the first mentioned pawl to be moved in the direction of travel of the glass by the frictional engagement of the polisher therewith.

4. The method of polishing glass which consists in moving the glass in one direction in operative engagement successively with a plurality of polishers, reversing the movement of the glass to cause it to travel in the opposite direction and selectively permitting a portion of the polishers to be moved back with the glass by frictional engagement therewith, while holding others of said polishers against such movement.

In testimony whereof I have hereunto set my hand.

JAMES W. CRUIKSHANK.